United States Patent
Antcliffe et al.

(10) Patent No.: US 12,007,786 B2
(45) Date of Patent: *Jun. 11, 2024

(54) SYSTEM AND METHOD FOR REAL-TIME LANE VALIDATION

(71) Applicant: GM Cruise Holdings LLC, San Francisco, CA (US)

(72) Inventors: Erin Antcliffe, San Francisco, CA (US); Jeremy Allan, Menlo Park, CA (US); Robin Yang, Oakland, CA (US); Andrew Robinson, San Francisco, CA (US); Lucio Otavio Marchioro Rech, San Francisco, CA (US); Brian Joseph Donohue, San Francisco, CA (US); Kavya Sambana, Castro Valley, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/129,659

(22) Filed: Mar. 31, 2023

(65) Prior Publication Data

US 2023/0251670 A1 Aug. 10, 2023

Related U.S. Application Data

(63) Continuation of application No. 16/836,517, filed on Mar. 31, 2020, now Pat. No. 11,644,846.

(51) Int. Cl.
*G05D 1/02* (2020.01)
*B60W 60/00* (2020.01)
*G01C 21/34* (2006.01)
*G01C 21/36* (2006.01)
*G05D 1/00* (2006.01)
*G08G 1/16* (2006.01)

(52) U.S. Cl.
CPC ....... *G05D 1/0276* (2013.01); *B60W 60/0053* (2020.02); *G01C 21/3415* (2013.01); *G01C 21/3691* (2013.01); *G08G 1/161* (2013.01); *G05D 1/0274* (2013.01)

(58) Field of Classification Search
CPC ........................... B60W 60/0053; G08G 1/161
See application file for complete search history.

(56) References Cited

U.S. PATENT DOCUMENTS

| | | | |
|---|---|---|---|
| 10,614,716 B1 | 4/2020 | Canavor et al. | |
| 11,682,295 B2 * | 6/2023 | Smith | G08G 1/0112 701/117 |
| 11,814,059 B1 * | 11/2023 | Reschka | B60W 40/09 |
| 2015/0253144 A1 | 9/2015 | Rau et al. | |

(Continued)

*Primary Examiner* — Jaime Figueroa
*Assistant Examiner* — Jerrod Irvin Davis
(74) *Attorney, Agent, or Firm* — Michael DiCato

(57) ABSTRACT

The subject disclosure relates to techniques for real-time lane validation. A process of the disclosed technologies can include steps for receiving a route from a remote computing system, the route indicating lanes on the route that an autonomous vehicle must traverse, traversing at least one lane of the lanes on the route, and sending sensor data to the remote computing system after traversing the at least one lane, the sensor data indicating whether the at least one lane is in accordance with a virtual lane of a virtual map, the virtual lane corresponding to the at least one lane.

20 Claims, 5 Drawing Sheets

(56) References Cited

U.S. PATENT DOCUMENTS

| | | |
|---|---|---|
| 2017/0148316 A1 | 5/2017 | Curlander et al. |
| 2018/0113459 A1 | 4/2018 | Bennie et al. |
| 2018/0209801 A1 | 7/2018 | Stentz et al. |
| 2018/0267558 A1 | 9/2018 | Tiwari et al. |
| 2019/0137287 A1 | 5/2019 | Pazhayampallil et al. |
| 2019/0368882 A1 | 12/2019 | Wheeler |
| 2020/0104289 A1 | 4/2020 | Premawardena |
| 2020/0125102 A1 | 4/2020 | Jiang et al. |
| 2020/0209846 A1 | 7/2020 | Chen |
| 2020/0233415 A1 | 7/2020 | Panzica et al. |
| 2020/0233426 A1 | 7/2020 | Johnson et al. |
| 2020/0240794 A1 | 7/2020 | Prasser et al. |
| 2020/0273341 A1 | 8/2020 | Urano et al. |
| 2020/0377078 A1 | 12/2020 | Liu et al. |
| 2020/0409368 A1 | 12/2020 | Caldwell et al. |
| 2021/0049901 A1 | 2/2021 | Young et al. |
| 2021/0095990 A1 | 4/2021 | Fowe et al. |
| 2021/0104160 A1 | 4/2021 | Gao et al. |
| 2021/0116907 A1 | 4/2021 | Altman |
| 2021/0163021 A1 | 6/2021 | Frazzoli et al. |
| 2021/0197798 A1 | 7/2021 | Funke et al. |
| 2021/0331703 A1 | 10/2021 | Duan et al. |
| 2022/0291690 A1 | 9/2022 | Goyal et al. |

\* cited by examiner

SYSTEM AND METHOD FOR REAL-TIME LANE VALIDATION

CROSS-REFERENCE TO RELATED APPLICATIONS

This application is a continuation of and claims the benefit of priority to U.S. application Ser. No. 16/836,517, filed on Mar. 31, 2020, entitled SYSTEM AND METHOD FOR REAL-TIME LANE VALIDATION, which is expressly incorporated by reference herein in its entirety.

TECHNICAL FIELD

The present technology provides solutions for real-time lane validation and in particular, using autonomous vehicles and specified routes to validate lanes in real-time.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

These autonomous vehicles rely on virtual maps to navigate on streets. Thus, these maps must be of high quality so that the autonomous vehicles have an accurate understanding of the real world. However, maintaining these maps is difficult, costly, and inefficient.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Autonomous vehicles rely heavily on virtual maps to navigate streets and specific lanes. For example, the virtual map may include lane information, obstacles like cones and sewer covers, objects like stop signs and streetlights, curb information, and other features. Due to the importance of these maps, virtual maps must be highly accurate in comparison to the corresponding real-world areas.

Some virtual maps are updated by driving around vehicles with cameras attached thereto and using the gathered sensor data to update the map. More specifically, a human driver drives a vehicle with the cameras on the vehicle, which gathers sensor data. When the driver returns the vehicle to an associated headquarters or other related facility, the driver uploads the sensor data from the vehicle to a server. However, this is difficult, slow, costly, and inefficient.

The disclosed technology discloses using an autonomous vehicle to simplify the updating process. However, simply using an autonomous vehicle results in further difficulties. For example, simply using an autonomous vehicle may result in the autonomous vehicle driving in areas having a virtual map area of low quality. Thus, deploying an autonomous vehicle relying solely on the virtual map in these areas may result in unexpected or non-ideal behavior. Furthermore, the autonomous vehicles would not target these low-quality areas because of the potentially dangerous conditions, resulting in the autonomous vehicles not updating these low-quality areas. Consequently, these low-quality areas may continue to degrade in accuracy with respect to the real-world over time.

Accordingly, the disclosed technology discloses a system and method for real-time lane validation to update virtual maps.

Figure 1:
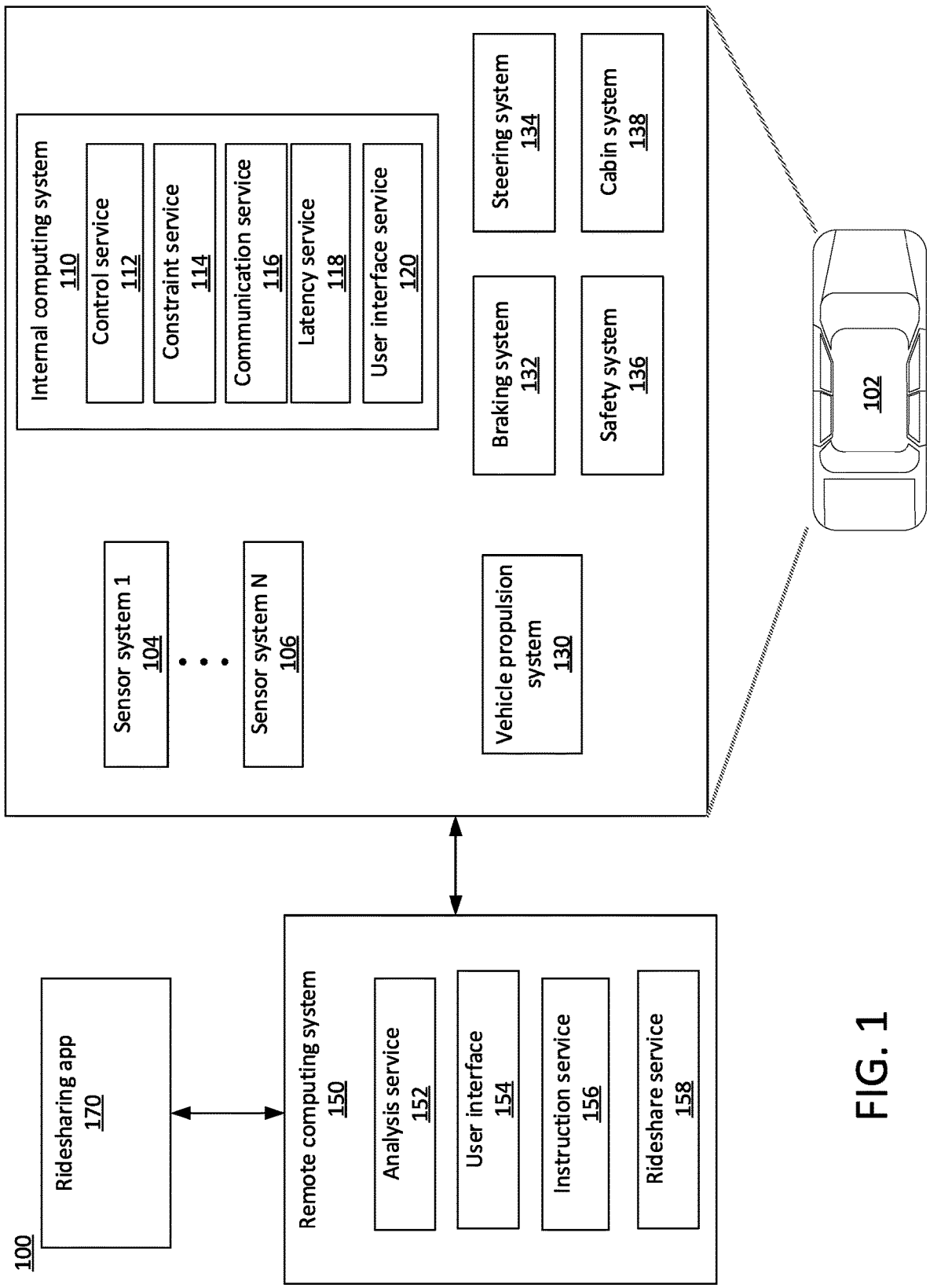
FIG. 1 shows an example system for operating an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc. Similarly, the remote computing system 150 is configured to communicate with other systems and databases to send and receive data. For example, the remote computing system 150 may communicate with a map database to send and receive virtual map data. As another example, the remote computing system 150 may communicate with a routing system by sending virtual map data and receiving a route based on the virtual map data.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. In some embodiments, the analysis service 152 may also include a routing system that is configured to receive virtual map data and determine a route having a plurality of lanes based on lanes in the virtual map data. In some embodiments, the route may comprise a plurality of waypoints that the autonomous vehicle 102 is instructed to navigate to and/or through.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. For example, the instructions service 156 can send the route determined by the routing system to the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
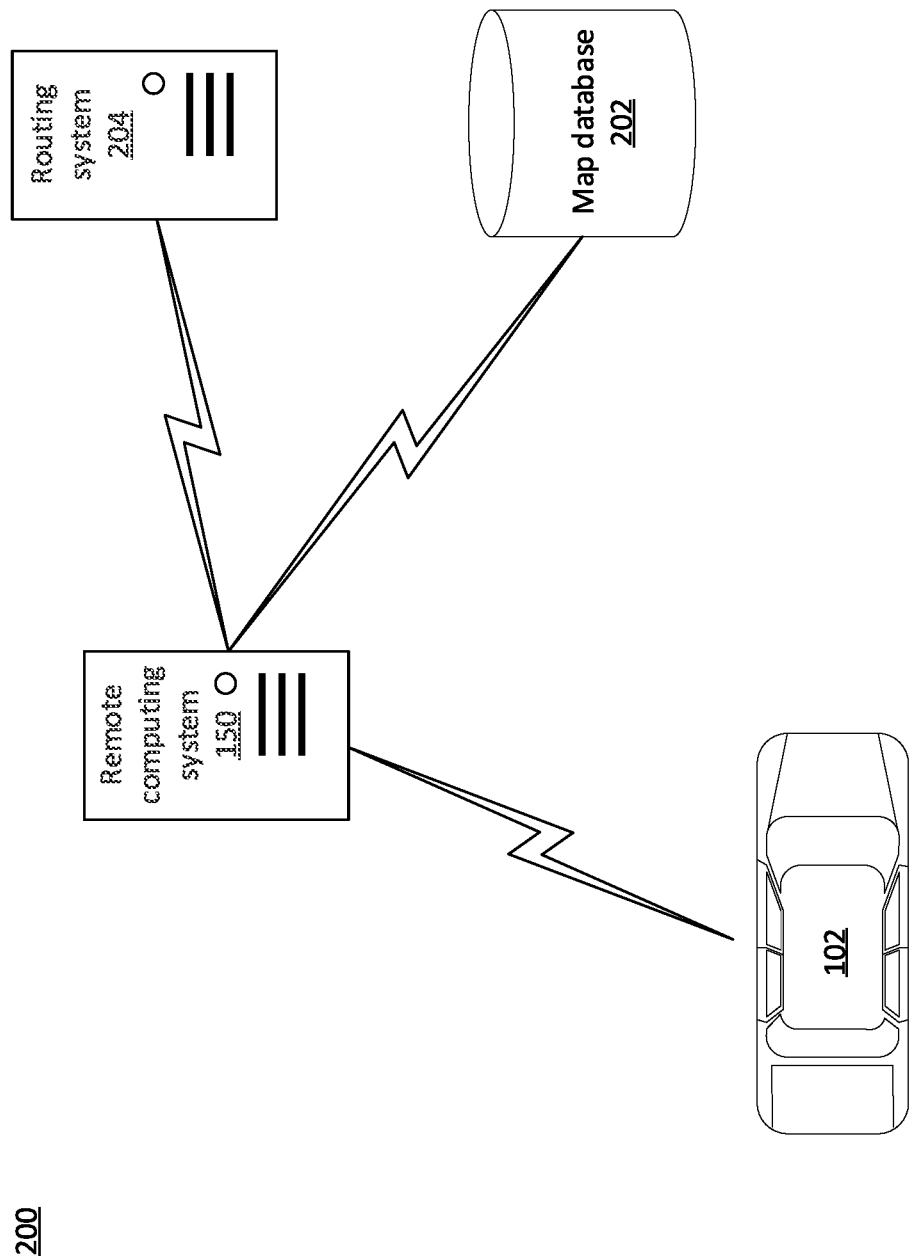
FIG. 2 is an example environment of an autonomous vehicle in communication with a remote computing system to validate virtual maps in real-time in accordance with some aspects of the present technology.

FIG. 2 shows an example environment in which an autonomous vehicle 102 is in communication with a remote computing system 150. The remote computing system 150 is further in communication with a map database 202 and a routing system 204.

The map database 202 is configured to contain, send, and receive virtual map data. In some embodiments, the virtual map data may include lane identifiers (lane IDs) associated with each lane, timestamps based on when a lane is updated and/or validated, obstacles, signs, and other objects that correlate to lanes in the real world.

The routing system 204 is configured to receive virtual map data, analyze the virtual map data, determine a route for the autonomous vehicle 102, and send the route to the remote computing system 150. For example, the routing system 204 may receive various lane IDs having various corresponding timestamps. In some embodiments, the routing system 204 may analyze the lane IDs based on the corresponding timestamps and determine a route for the autonomous vehicle 102 to traverse and validate, such that the route includes lane IDs with corresponding timestamps older than a threshold time. In other words, the routing system 204 may select specific lane IDs based on an amount of time that has passed since the lane was last updated and/or validated. The routing system 204 may then send the route to the remote computing system 150.

As described above, the autonomous vehicle 102 and the remote computing system 150 are configured to send and receive data to each other. Thus, the remote computing system 150 may then send the route determined by the routing system 204 to the communication service 116 of the internal computing system 110 of the autonomous vehicle 102.

The internal computing system 110 may then traverse the route using the control service 112 and the constraint service 114. As the autonomous vehicle 102 traverses each lane of the route, the sensor systems 104-106 capture sensor data. As the autonomous vehicle 102 completes a section of the lane, the internal computing system 110 may send the sensor data captured by the sensor systems 104-106 to the remote computing system 150. Additionally, the internal computing system 110 may timestamp the sensor data using latency service 118. Using analysis service 152, the remote computing system 150 may then validate the virtual map data. In some embodiments, the remote computing system 150 may determine whether the sensor data matches with the virtual map data. For example, the sensor data may include a pothole in a specific lane, while a corresponding virtual lane in the virtual map database does not include a pothole. Thus, the sensor data would not match the virtual map data.

The remote computing system 150 may then update the map database. More specifically, the remote computing system 150 may change the virtual map data to include any discrepancies between the captured sensor data and the virtual map data. Similarly, the remote computing system 150 may simply change the timestamp associated with the virtual map data if no discrepancies exist between the captured sensor data and the virtual map data.

It is further contemplated that the validation may occur on the internal computing system 110. More specifically, the internal computing system 110 may also utilize the virtual map data and actively compare the virtual map data with the captured sensor data. When the captured sensor data is different from the virtual map data, the internal computing system 110 may then send the captured sensor data to the remote computing system 150.

Figure 3:
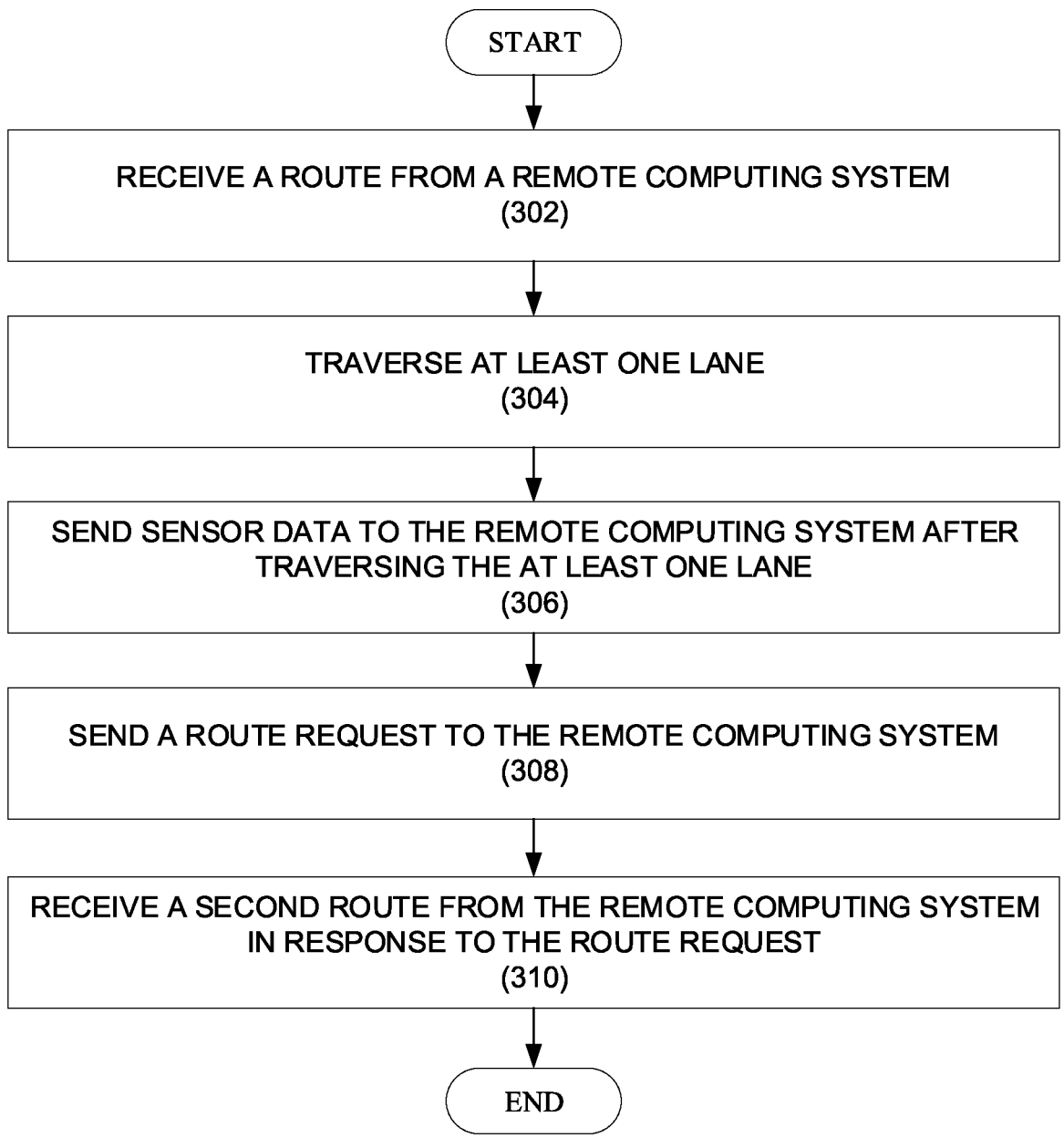
FIG. 3 is an example method implemented by an autonomous vehicle to validate lanes in real-time and update a virtual map in accordance with some aspects of the present technology.

FIG. 3 shows an example method 300 implemented by an autonomous vehicle 102 to validate lanes in real-time and update a virtual map. The method 300 begins with step 302, in which the autonomous vehicle 102 receives a route from a remote computing system 150. The route indicates lanes on the route that the autonomous vehicle 102 must traverse or is heavily recommended to traverse. In some embodiments, the lanes are based upon corresponding lengths of time that have elapsed since an autonomous vehicle traversed the lanes. Furthermore, in some embodiments, lanes have an entry and exit, such that validating the lane may require the autonomous vehicle 102 to enter the lane via the entry, traverse the lane, and exit the lane via the exit.

In step 304, the autonomous vehicle 102 then traverses at least one lane of the route. In some scenarios, the autonomous vehicle 102 may encounter scenarios where the autonomous vehicle 102 is no longer capable of traversing the lanes. In such scenarios, the autonomous vehicle 102 may relinquish control of the autonomous vehicle 102 to a human driver. The internal computing system 110 may then determine that the at least one lane is not in accordance with the virtual lane of the virtual map. In other words, the internal computing system 110 may determine that due to the discrepancies between the real-world and the virtual map, the autonomous vehicle 102 is incapable of traversing the lanes.

In step 306, the autonomous vehicle 102 then sends the sensor data to the remote computing system 150 after traversing the at least one lane. The sensor data may indicate whether the at least one lane is in accordance with a virtual lane of a virtual map that corresponds to a lane in the real-world. In the embodiments of the lanes having entries and exits, the autonomous vehicle 102 may enter or exit a different lane via a lane change instead of through the entry or exit due to external influences, such as a doubled parked vehicle, debris in the road, an animal running into the road, etc. In these embodiments, the autonomous vehicle 102 may determine not to send the sensor data obtained during the traversal of the lanes that the autonomous vehicle 102 changed into and out from. Similarly, in some embodiments, the sensor data obtained after relinquishing control to a human driver may be withheld so that only sensor data from successful traversal of the at least one lane is sent to the remote computing system. For example, withheld sensor data may, in some scenarios, be bad data, such that the virtual lane is an accurate portrayal of the lane, but because an animal ran into the road, the autonomous vehicle 102 needed to change lanes to avoid the animal. Thus, the sensor data may have indicated that the lane did not match the virtual map, when in reality, the virtual lane was correct. Thus, in some embodiments, the sensor data is only sent to the remote computing system 150 when the autonomous vehicle 102 enters and exits the lanes through the corresponding entries and exits. In other words, the sensor data is only sent to the remote computing system 150 when the autonomous vehicle 102 explores an entirety of the lane.

In step 308, the autonomous vehicle 102 sends a route request to the remote computing system 150. More specifically, the internal computing system 110 sends the route request, via the communication service 116, to the remote computing system 150. In some embodiments, the autonomous vehicle 102 may deviate from route due to external influences, such as a doubled park vehicle, debris in the road, an animal running into the road, etc. The autonomous vehicle 102 may then send the route request to the remote computing system 150 in similar situations.

In step 310, the autonomous vehicle 102 receives a second route from the remote computing system 150 in response to the route request. More specifically, the internal computing system 110 of the autonomous vehicle 102 receives, via the communication service 116, the second route from the remote computing system 150. Furthermore, the second route is now based on updated map data. The updated map data is based upon the sensor data sent by the autonomous vehicle 102 to the remote computing system 150. In some embodiments, the updated map data may further be based upon additional sensor data received from at least one other autonomous vehicle. In other words, the autonomous vehicle 102 may be in a fleet of autonomous vehicles that communicate sensor data to the remote computing system 150, which in turn may update the map data.

In scenarios where there the autonomous vehicle 102 deviated from the route, the second route may also provide waypoints to guide the autonomous vehicle 102 back to a section of the route so that the autonomous vehicle 102 may finish the route.

Figure 4:
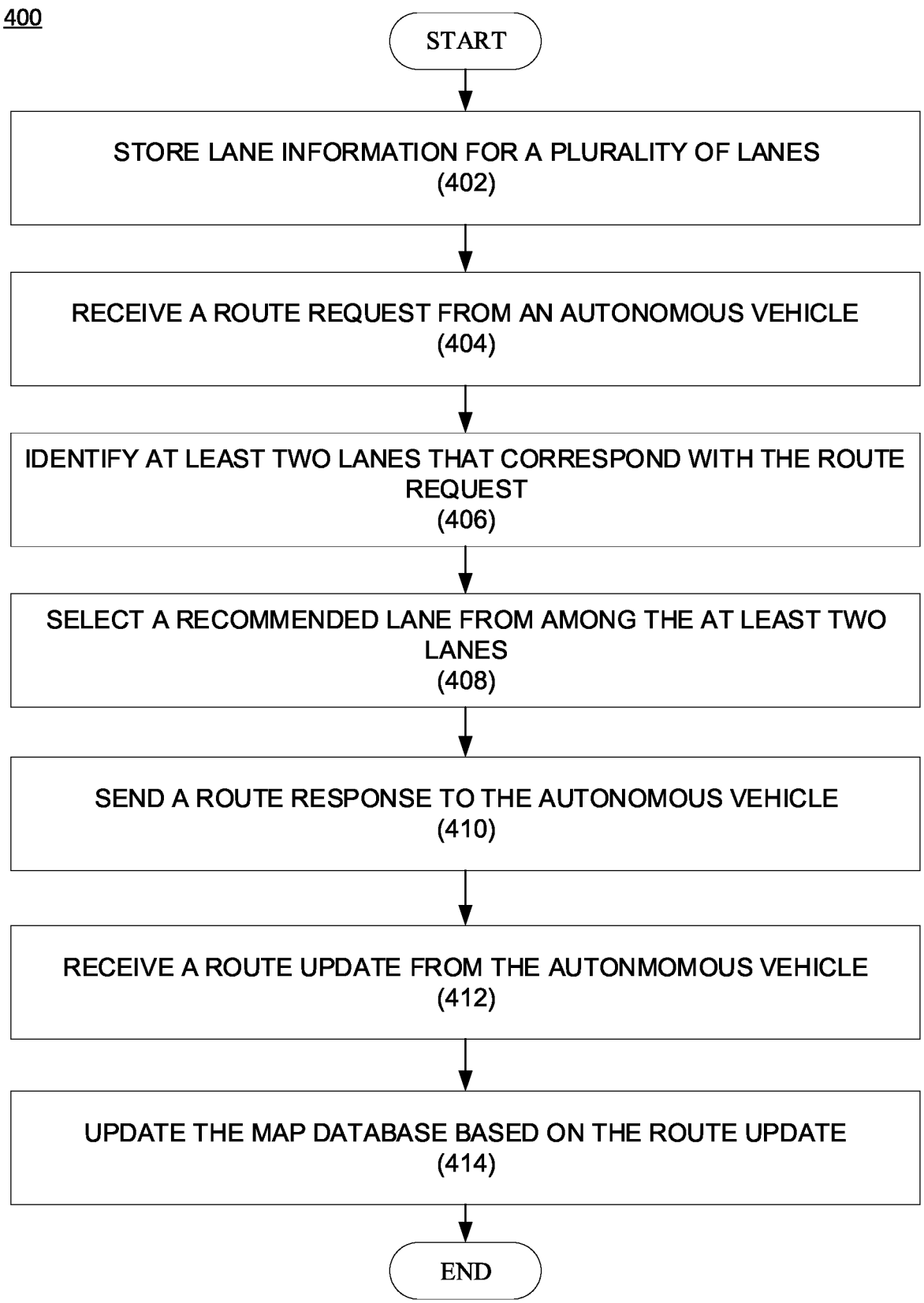
FIG. 4 is an example method implemented by a remote computing system to validate lanes in real-time and update a virtual map in accordance with some aspects of the present technology.

FIG. 4 shows an example method 400 implemented by a remote computing system 150 to validate lanes in real-time and update a virtual map. The example method 400 begins at step 402, in which the remote computing system 150 stores lane information for a plurality of lanes in a map database. Each lane of the plurality of lanes is associated with an update timestamp defining the most recent update of the lane. In some embodiments the update timestamp may also be based upon a geographic location of the lane.

In some embodiments, the update timestamp is based upon a time decay function. The time decay function may be based upon time that has elapsed since the most recent update of the lane. The output of the time decay function may then be compared against a threshold value, such that when the output passes the threshold value, the lane may be flagged for review and/or validation.

In step 404, the remote computing system 150 receives a route request from an autonomous vehicle 102. In some embodiments, the route request may include a start location and an end location. In some embodiments, the route request may indicate that the autonomous vehicle 102 is available to navigate to any destination through any sequence of lanes and streets. In other words, the autonomous vehicle 102 may be set to wander around the streets.

In step 406, the remote computing system 150 identifies at least two lanes that correspond with the route request. For example, a street typically has multiple lanes thereon. The remote computing system 150 may then identify at least two individual lanes in the street. In some embodiments, the remote computing system 150 communicates with a routing system to identify the at least two lanes.

In step 408, the remote computing system 150 selects a recommended lane from among the at least two lanes. Continuing the example above, the street may have multiple lanes thereon. The autonomous vehicle 102 is only capable of safely driving one lane at a time. Therefore, the remote computing system 150 selects a recommended lane from the at least two lanes. As stated above, the lanes may be selected based on a time decay function, such that a lane that has not been updated for a longer period of time is more highly recommended or more likely to be recommended. In some embodiments, the remote computing system 150 communicates with a routing system to select the recommended lane from among the at least two lanes.

In step 410, the remote computing system 150 sends a route response to the autonomous vehicle 102. The route response includes data identifying the recommended lane. In other words, the remote computing system 150 sends a route in the route response to the autonomous vehicle 102. The route includes selected and/or recommended lanes for the autonomous vehicle 102 to traverse.

In step 412, the remote computing system 150 receives a route update from the autonomous vehicle 102. The route update may include sensor data obtained by sensor systems on the autonomous vehicle 102. In other words, the route update may comprise information collected by one or more sensors of the autonomous vehicle while traversing the recommended lane. Furthermore, the route update may include timestamps to identify when the sensor data was obtained.

In step 414, the remote computing system 150 updates the map database based on the route update received from the autonomous vehicle 102. In some embodiments, the remote computing system 150 may compare the data in the route update to a corresponding portion of the map database to identify differences between the sensor data and the virtual map. In other words, the remote computing system 150 may compare the sensor data and the virtual map to determine how the real-world has changed in comparison to the virtual map. The remote computing system 150 may then change and/or update the virtual map to more accurately depict the real-world. The remote computing system 150 may also update the update timestamp of the corresponding portion of the map database.

Figure 5:
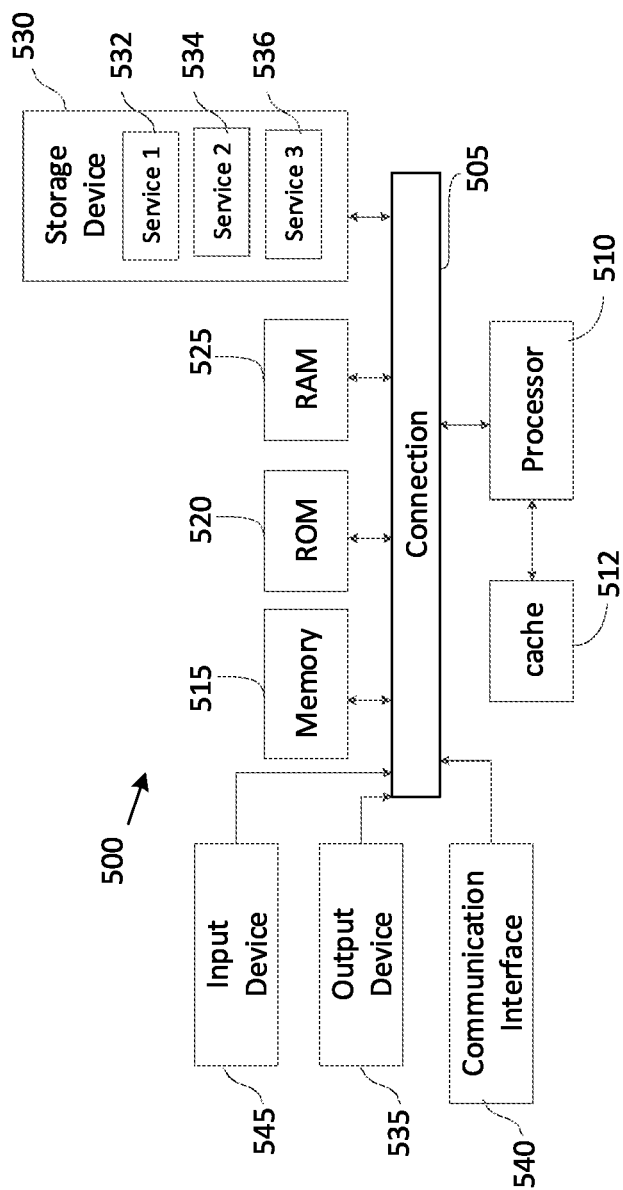
FIG. 5 shows an example of a system for implementing certain aspects of the present technology.

FIG. 5 shows an example of computing system 500, which can be for example any computing device making up internal computing system 110, remote computing system 150, (potential) passenger device executing rideshare app 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A method comprising:
   traversing, by an autonomous vehicle, at least one lane of a route; and
   sending sensor data to a remote computing system after traversing the at least one lane, the sensor data indicating whether the at least one lane is in accordance with a virtual lane of a virtual map, the virtual lane corresponding to the at least one lane, wherein the at least one lane is in accordance with the virtual lane when the autonomous vehicle enters the at least one lane via an entry of the at least one lane and exits the at least one lane via an exit of the at least one lane.

2. The method of claim 1, further comprising:
sending a route request to the remote computing system; and
receiving a second route from the remote computing system in response to the route request, the second route based upon updated map data,
wherein the updated map data is based upon the sensor data.

3. The method of claim 2, wherein the updated map data is further based upon additional sensor data received from at least one other autonomous vehicle.

4. The method of claim 1, further comprising:
relinquishing control of the autonomous vehicle to a human driver; and
determining that the at least one lane is not in accordance with the virtual lane.

5. The method of claim 1, wherein the route indicates that the autonomous vehicle must traverse the at least one lane.

6. The method of claim 1, further comprising:
deviating from the route; and
sending a route request for a second route to the remote computing system; and
receiving the second route from the remote computing system, the second route providing waypoints to guide the autonomous vehicle back to a section of the route,
wherein the second route is based upon updated map data and the updated map data is based upon the sensor data.

7. The method of claim 1, wherein the sensor data includes a timestamp.

8. A non-transitory computer-readable medium comprising instructions thereon, the instructions effective to cause at least one processor to:
traversing, by an autonomous vehicle, at least one lane of a route; and
sending sensor data to a remote computing system after traversing the at least one lane, the sensor data indicating whether the at least one lane is in accordance with a virtual lane of a virtual map, the virtual lane corresponding to the at least one lane, wherein the at least one lane is in accordance with the virtual lane when the autonomous vehicle enters the at least one lane via an entry of the at least one lane and exits the at least one lane via an exit of the at least one lane.

9. The non-transitory computer-readable medium of claim 8, wherein the instructions are further effective to cause the at least one processor to:
send a route request to the remote computing system; and
receive a second route from the remote computing system in response to the route request, the second route based upon updated map data,
wherein the updated map data is based upon the sensor data.

10. The non-transitory computer-readable medium of claim 9, wherein the updated map data is further based upon additional sensor data received from at least one other autonomous vehicle.

11. The non-transitory computer-readable medium of claim 8, wherein the instructions are further effective to cause the at least one processor to:
relinquish control of the autonomous vehicle to a human driver; and
determine that the at least one lane is not in accordance with the virtual lane.

12. The non-transitory computer-readable medium of claim 8, wherein the route indicates that the autonomous vehicle must traverse the at least one lane.

13. The non-transitory computer-readable medium of claim 8, wherein the instructions are further effective to cause the at least one processor to:
deviate from the route; and
send a route request for a second route to the remote computing system; and
receive the second route from the remote computing system, the second route providing waypoints to guide the autonomous vehicle back to a section of the route,
wherein the second route is based upon updated map data and the updated map data is based upon the sensor data.

14. The non-transitory computer-readable medium of claim 8, wherein the sensor data includes a timestamp.

15. A system, comprising:
a processor; and
a memory storing computer-executable instructions effective to cause the processor to:
traversing, by an autonomous vehicle, at least one lane of a route; and
sending sensor data to a remote computing system after traversing the at least one lane, the sensor data indicating whether the at least one lane is in accordance with a virtual lane of a virtual map, the virtual lane corresponding to the at least one lane, wherein the at least one lane is in accordance with the virtual lane when the autonomous vehicle enters the at least one lane via an entry of the at least one lane and exits the at least one lane via an exit of the at least one lane.

16. The system of claim 15, wherein the instructions are further effective to cause the processor to:
send a route request to the remote computing system; and
receive a second route from the remote computing system in response to the route request, the second route based upon updated map data,
wherein the updated map data is based upon the sensor data.

17. The system of claim 16, wherein the updated map data is further based upon additional sensor data received from at least one other autonomous vehicle.

18. The system of claim 15, wherein the instructions are further effective to cause the processor to:
relinquish control of the autonomous vehicle to a human driver; and
determine that the at least one lane is not in accordance with the virtual lane.

19. The system of claim 15, wherein the route indicates that the autonomous vehicle must traverse the at least one lane.

20. The system of claim 15, wherein the instructions are further effective to cause the processor to:
deviate from the route; and
send a route request for a second route to the remote computing system; and
receive the second route from the remote computing system, the second route providing waypoints to guide the autonomous vehicle back to a section of the route,
wherein the second route is based upon updated map data and the updated map data is based upon the sensor data.

* * * * *